United States Patent Office 3,525,626
Patented Aug. 25, 1970

3,525,626
COLA BEVERAGE COMPOSITION
Robert L. Swaine, Lynnfield, and Donna W. Beusch, Cambridge, Mass., assignors to William C. Clay, Jr., Mount Sterling, Ky.
No Drawing. Filed July 13, 1965, Ser. No. 471,730
Int. Cl. A23l 1/00
U.S. Cl. 99—78        2 Claims

ABSTRACT OF THE DISCLOSURE

A dry powder composition suitable for blending with heated water to form a hot cola beverage consisting essentially of from 10 to 20 weight percent of a cola flavoring, from 0.1 to 0.25 weight percent of vanilla powder, from 1 to 7 weight percent of extract of kola N.F., from 70 to 80 weight percent of sucrose, and from 0.4 to 0.7 weight percent of hydrated citric acid. Up to 0.5 weight percent of catechu extract, and up to 0.00003 weight percent of oil of patchouly are included in the composition.

---

This invention is directed to a cola beverage composition, and more particularly to a cola beverage composition which may be served hot.

There are a limited number of hot beverages, namely coffee, tea, cocoa, and soups. Most commonly, neither coffee nor tea are served to children. Rather, these beverages are gradually adopted, and their tastes "learned" during the period between thirteen and twenty years of age.

Unlike coffee or tea, cola-flavored carbonated beverages are in prevalent use with sub-teen children. Notwithstanding this, there has never been a successful cola-flavored hot beverage, which would permit children to make the transition from a cola-flavored carbonated cold beverage to a hot beverage, which is analogous to coffee or tea. This transition, if possible, would obviate the necessity for "learning" the taste of coffee or tea.

The reason for the absence of a satisfactory cola-flavored hot beverage is that the cola flavor is thermally unstable. Thus, the components making up the typical cola flavoring used in carbonated drinks tend to distill off and/or decompose when heated. As a result, the typical cola-flavored carbonated beverage is unpalatable, when heated.

This invention has as an object the provision of a novel cola beverage composition.

This invention has as another object the provision of a novel cola beverage composition, which may be stored in dry powdered form, and which may be admixed with heated water to yield a palatable hot beverage.

Other objects will appear hereinafter.

These objects are achieved by the composition of the present invention which comprises a liquid cola flavoring, vanilla powder, extract of kola N.F., sucrose, and hydrated citric acid. The composition of the present invention is in the form of a powder which may be stored for protracted periods of time in sealed containers without loss of flavor. The user adds approximately eight grams for a six ounce serving or eleven grams for an eight ounce serving to hot water, and stirs.

The compositions of the present invention yield a delightful flavor and odor when blended with hot water. To our knowledge, they constitute the first compositions which yield a palatable hot cola beverage.

The cola flavoring used in compositions of our invention should be present in the amount of from 10 to 20 weight percent, with an optimum weight percentage of about 16.5. The flavor strength of the cola flavoring should be sufficient so that one ounce of the cola flavoring syrup gives one gallon of finished bottler's syrup (such finished bottler's syrup is normally diluted in the ratio of one ounce to five ounces of carbonated water). A wide variety of liquid cola flavorings may be used, a suitable cola flavoring being set forth at page 264 of Food Flavorings by Joseph Merory (Avi Publishing Company, 1960) as MF 212. This cola flavoring should be concentrated so that one ounce of the flavoring gives one gallon of finished bottler's syrup. The flavoring, as set forth in Merory, is as follows:

12.0 fl. oz. cola nut extract, formula MF 211
2.0 fl. oz. vanilla extract two-fold, formula MF 64, and solution of: 2.0 oz. av. caffeine and
10.0 fl. oz. water
16.0 fl. oz. glycerin
32.0 fl. oz. lime juice
32.0 fl. oz. caramel, acid proof
12.0 fl. oz. cola flavor base of formula MF 209
12.0 fl. oz. alcohol, 95 percent The aforesaid formulation is known in the bottling trade as a 4:1 flavor concentrate since four ounces of the aforesaid formulation are used for one gallon of bottler's syrup.

The vanilla powder used in the composition of our invention constitutes the vanilla powder as defined in 21 C.F.R. 22.a, and amended at Federal Register 9983 effective Dec. 12, 1962. The vanilla powder should be present in the concentration of 0.1 to 0.25 weight percent, with optimum concentration of 0.19 weight percent.

The extract of kola N.F. should be present in a weight percentage range of from 1 to 7 weight percent, with an optimum weight percentage of about 3.5 weight percent.

The sucrose should be present in a range of from 70 to 80 weight percent, and preferably about 75 weight percent.

The hydrated citric acid should be present in the range of 0.4 to 0.7 weight percent, and preferably about 0.56 weight percent.

The aforesaid components are essential components in terms of preparing a dry powder composition which will yield a hot cola beverage. However, it is desirable to have in the composition for greater depth of flavor up to 0.5 weight percent of catechu extract, and preferably about 0.36 weight percent of catechu extract. In addition, up to 0.00003 weight percent of oil of patchouly may be present, and preferably about 0.000015 weight percent of oil of patchouly.

In addition, the composition should be colored with a caramel color, such as from 3.4 weight percent of a caramel color.

The composition of the present invention is prepared by mixing the components in a dry blender at room temperature, followed by drying in a forced air oven, such as by passing air at a temperature of 140° F. over the powder for a period of one hour. After this initial drying, the composition should be granulated, and then dried for another one-half hour to be sure that all moisture has been removed. We have found that moisture is deleterious to the composition of the present invention for two reasons, namely it leads to caking, and it also tends to degrade the cola flavor.

We have found that added caffeine is undesirable in the composition of the present invention, as many parents prefer not to give their children caffeine containing beverages.

In order to illustrate the present invention, there is set forth the following example:

EXAMPLE I

| Ingredient: | Percent by weight |
|---|---|
| Sucrose | 75.11 |
| Powdered caramel color | 3.76 |
| Vanilla powder | 0.19 |
| Extract of catechu | 0.36 |
| Extract of kola N.F. | 3.49 |
| Hydrated citric acid | 0.56 |
| Cola flavoring | 16.53 |
| Oil of patchouly | 0.000015 |

The heated beverage will have a pronounced cola and citrus flavor and odor.

The present invention may be embodied in other specific forms without departing from the spirit or essential attributes thereof and, accordingly, reference should be made to the appended claims, rather than to the foregoing specification as indicating the scope of the invention.

We claim:

1. A dry powder composition suitable for blending with heated water to form a hot cola beverage consisting essentially of and including each of the following from 10 to 20 weight percent of a cola flavoring, from .1 to 0.25 weight percent of vanilla powder, from 1 to 7 weight percent of extract of kola N.F., from 70 to 80 weight percent of sucrose, from 0.4 to 0.7 weight percent of hydrated citric acid, extract of catechu up to 0.5 weight percent, and oil of patchouly up to 0.00003 weight percent.

2. A dry powder composition suitable for blending with heated water to form a hot cola beverage consisting essentially of 16.5 weight percent of cola flavoring, 0.19 weight percent of vanilla powder, 3.5 weight percent of extract of kola N.F., 75 weight percent of sucrose, 0.56 weight percent of hydrated citric acid, 0.36 weight percent of extract of catechu, and 0.000015 weight percent of oil of patchouly.

References Cited

UNITED STATES PATENTS

| | | | |
|---|---|---|---|
| 2,851,361 | 9/1958 | Diller | 99—78 |
| 2,868,646 | 1/1959 | Schapiro | 99—78 |

A. LOUIS MONACELL, Primary Examiner

S. B. DAVIS, Assistant Examiner

U.S. Cl. X.R.

99—28